United States Patent
Gryb et al.

(10) Patent No.: US 11,698,982 B2
(45) Date of Patent: *Jul. 11, 2023

(54) SYSTEM AND METHOD FOR PROTECTING LOCATION DATA

(71) Applicant: Visa International Service Association, San Francisco, CA (US)

(72) Inventors: Oleg Gryb, San Francisco, CA (US); Akshay Bhaskaran, Austin, TX (US); Ravi Krishnan Muthukrishnan, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/466,989

(22) Filed: Sep. 3, 2021

(65) Prior Publication Data
US 2021/0397723 A1 Dec. 23, 2021

Related U.S. Application Data

(63) Continuation of application No. 16/455,554, filed on Jun. 27, 2019, now Pat. No. 11,138,321.

(51) Int. Cl.
*G06F 21/60* (2013.01)
*H04L 9/30* (2006.01)
(Continued)

(52) U.S. Cl.
CPC ............ *G06F 21/602* (2013.01); *H04L 9/085* (2013.01); *H04L 9/0872* (2013.01); *H04L 9/302* (2013.01);
(Continued)

(58) Field of Classification Search
CPC ... G06F 21/602; H04W 12/63; H04W 12/033; H04W 12/64; H04L 9/085; H04L 9/0872; H04L 9/302
See application file for complete search history.

(56) References Cited

U.S. PATENT DOCUMENTS 8,316,237 B1 * 11/2012 Felsher .................. H04L 9/0825
713/171
10,666,431 B1 * 5/2020 Nguyen .................. H04L 67/26
(Continued)

FOREIGN PATENT DOCUMENTS

WO 2019045741 A1 3/2019

OTHER PUBLICATIONS

U.S. Appl. No. 16/455,554, "Non-Final Office Action", dated Jan. 22, 2021, 8 pages.
(Continued)

*Primary Examiner* — Ayoub Alata
(74) *Attorney, Agent, or Firm* — Kilpatrick Townsend & Stockton LLP

(57) ABSTRACT

Systems and methods for securing user location data are described. A method includes receiving, by a location server computer, an encrypted location from a mobile device. The encrypted location is a location of the mobile device encrypted with a public key. The method then includes receiving, by the location server computer, a location request message from an interaction processing server and partially decrypting, by the location server computer, the encrypted location with a first private key share to form a partially decrypted location. The method further includes transmitting, by the location server computer to the interaction processing server, a location response message with the encrypted location and the partially decrypted location. The interaction processing server then uses the partially decrypted location and the second private key share to form a decrypted location.

20 Claims, 9 Drawing Sheets

(51) Int. Cl.
*H04L 9/08* (2006.01)
*H04W 12/033* (2021.01)
*H04W 12/63* (2021.01)
*H04W 12/64* (2021.01)

(52) U.S. Cl.
CPC ......... *H04W 12/033* (2021.01); *H04W 12/63* (2021.01); *H04W 12/64* (2021.01)

(56) References Cited

U.S. PATENT DOCUMENTS

2019/0081796 A1* 3/2019 Chow .................... H04L 9/30
2020/0344222 A1* 10/2020 Manges ............... H04L 9/0816

OTHER PUBLICATIONS

U.S. Appl. No. 16/455,554 , "Notice of Allowance", dated Jun. 17, 2021, 8 pages.
Lindell , "Unbound (Math Over Matter), A Primer in Secure Multiparty Computation", available online at www.unboundtech.com, Jan. 24, 2018, 12 pages.
PCT/US2018/052448 , "International Application No.", Sep. 24, 2018.

* cited by examiner

SYSTEM AND METHOD FOR PROTECTING LOCATION DATA

CROSS-REFERENCE TO RELATED APPLICATIONS

This application is a continuation of U.S. patent application Ser. No. 16/455,554, filed Jun. 27, 2019, which is hereby incorporated by reference in its entireties for all purposes.

BACKGROUND

Location systems may use the location of a user for authentication, authorization, and other processes. However, in many location systems, locations of a user may be sent between different entities as plaintext. This may give rise to data security concerns, as users may not want large amounts of their data to be made widely available. Additionally, communications of the location can be intercepted, and then the location of the user can be compromised. There may be a desire to limit the number of entities that have access to users' location data.

In a traditional location determination system, a mobile device of a user may periodically send location updates to a location server. The location server may store a record of the location updates sent by the mobile device. When the user performs an interaction that needs to be authorized, an interaction processing server can request a location of the user from the location server. If the location of the user's mobile device matches the location of the origin of the interaction (e.g., a location where the user's mobile device interacts with an access terminal such as a POS terminal), then the transaction is likely being conducted to a legitimate user.

While such systems are effective, a number of improvements can be made with respect to data security. For example, communications between the mobile device and the location server, or between the location server and the interaction processing server may be intercepted by a malicious entity, leaking information relating to the visited locations of the user. Additionally, if the location server is compromised, a detailed picture of the user's locations and habits may be revealed.

Embodiments of the invention address these and other problems individually and collectively.

BRIEF SUMMARY

One embodiment includes receiving, by a location server computer, an encrypted location from a mobile device, wherein the encrypted location is a location of the mobile device encrypted with a public key. The method then includes receiving, by the location server computer, a location request message from an interaction processing server and partially decrypting, by the location server computer, the encrypted location with a first private key share to form a partially decrypted location. The method then includes transmitting, by the location server computer to the interaction processing server, a location response message with the encrypted location and the partially decrypted location, wherein the interaction processing server uses the partially decrypted location and a second private key share to form a decrypted location.

Another embodiment includes a location server computer comprising a processor and a computer-readable medium comprising code executable by the processor to implement a method that includes receiving an encrypted location from a mobile device, wherein the encrypted location is a location of the mobile device encrypted with a public key. The method then includes receiving a location request message from an interaction processing server and partially decrypting the encrypted location with a first private key share to form a partially decrypted location. The method then includes transmitting, to the interaction processing server, a location response message with the encrypted location and the partially decrypted location, wherein the interaction processing server uses the partially decrypted location and a second private key share to form a decrypted location.

Another embodiment includes a method comprising receiving, by the interaction processing server, an authorization request message from a resource provider computer for an interaction and sending, by the interaction processing server, to a location server computer, a location request message. The method then includes receiving, by the interaction processing server from the location server computer, a partially decrypted location and an encrypted location, wherein the partially decrypted location was decrypted using a first private key share and decrypting, by the interaction processing server, the encrypted location using the partially decrypted location and a second private key share. The method then includes initiating authorizing, by the interaction processing server, the interaction based on at least the decrypted location.

Further details regarding embodiments of the invention can be found in the Detailed Description and the Figures.

DETAILED DESCRIPTION

Figure 1:
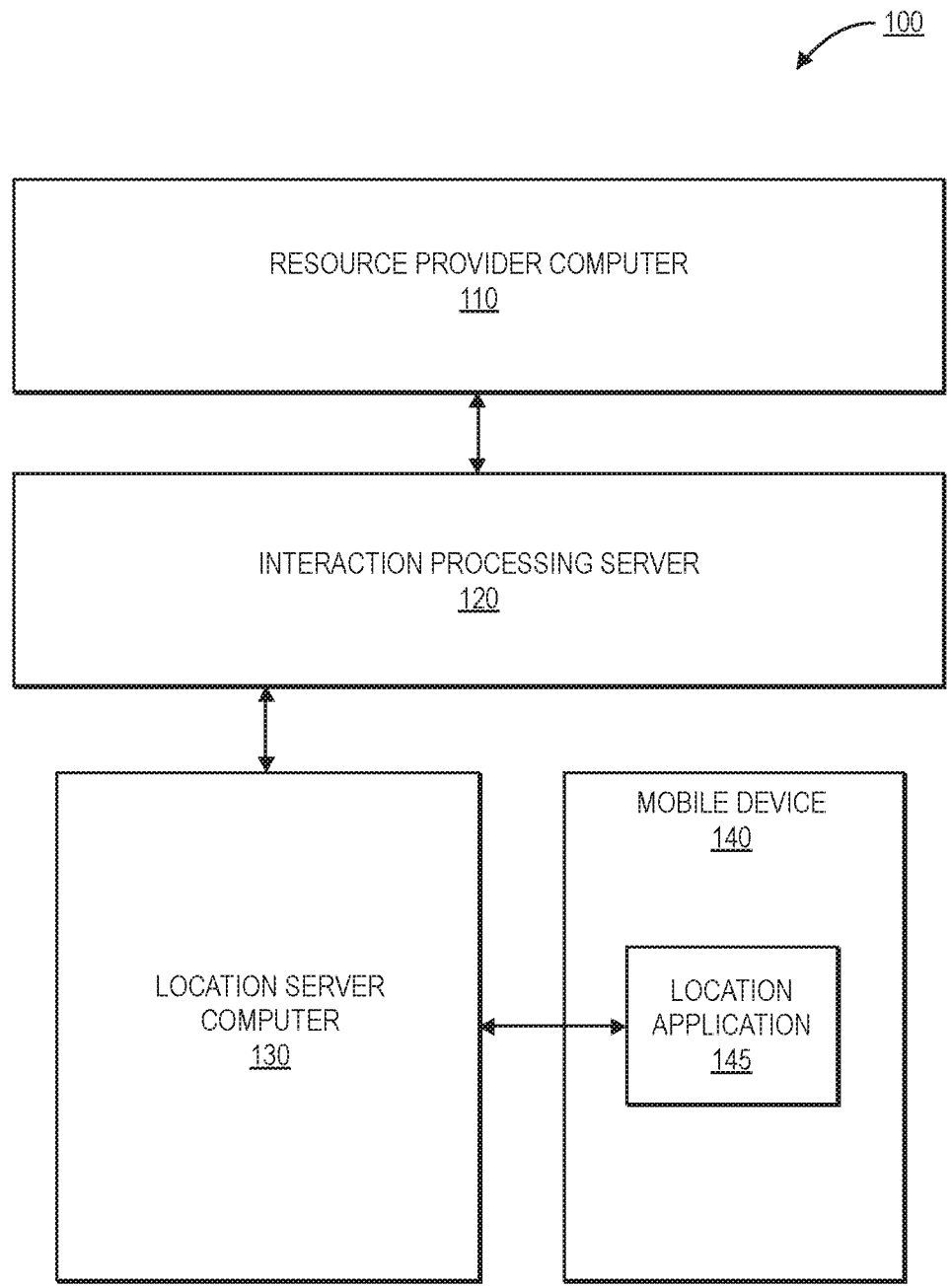
FIG. 1 is a block diagram of a system according to embodiments.

Embodiments provide systems and methods for securing user location data. A mobile device of a user can determine its location and encrypt that location with a public key received from a location server computer. The mobile device can then periodically send encrypted locations to the location server computer. When the location server computer receives a location request message from an interaction processing server, as part of an interaction between the user and a resource provider, the location server computer can retrieve the encrypted location of the mobile device. The location server computer can then partially decrypt the encrypted location using a first share of a private key. Then, the location server computer can send the partially decrypted location, and the encrypted location, to the interaction processing server. The interaction processing server can use a second share of the private key to fully decrypt the location of the mobile device. The fully decrypted location of the mobile device can then be used by the interaction processing server in authorization of the interaction.

Embodiments may use multi-party RSA (Rivest-Shamir-Adleman) encryption. Embodiments that use multi-party RSA encryption provide for a number of advantages, such as decrypting locations if an interaction processing server and a location server agree to the decryption. Locations are encrypted at any point before that. RSA encryption can allow multi-party computation to be done with relatively few messages, increasing the efficiency of the system.

Prior to discussing embodiments of the invention, some terms can be described in further detail.

A "mobile device" may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions.

A "user" may include an individual or a computational device. In some embodiments, a user may be associated with one or more personal accounts and/or mobile devices. In some embodiments, the user may be a cardholder, account holder, or consumer.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

A "resource provider computer" may include any system associated with a resource provider. In some embodiments, the resource provider computer may handle functionality of a mobile application and/or a website associated with the resource provider from which a user may acquire resources.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

An "issuer" may be a financial institution, such as a bank, that creates and maintains financial accounts for account holders. An issuer or issuing bank may issue and maintain financial accounts for consumers. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication).

An "acquirer" may be a financial institution associated with a resource provider. Acquirers typically provide resource providers with a bank account, and in some cases, transaction accepting infrastructure. Generally, after a transaction has been authorized and as part of the settlement process, funds are transferred from the issuer to resource provider's account at the acquirer. The acquirer may also communicate payment transaction status with the resource provider. The acquirer may operate an acquirer computer, which may generically be a transport computer.

A "payment processing network" may be data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

An "authorizing entity" may be an entity that authorizes a request, typically using an authorizing computer to do so. An authorizing entity may be an issuer, a governmental agency, a document repository, an access administrator, etc.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

An "authorization request message" may be a message that is sent to request authorization for an interaction. An authorization request message may be sent, for example to a secure data server, a payment processing network, an issuer of a payment card, a processing gateway, etc. An authorization request message may also comprise additional data elements corresponding to "identification information" including, for example, a service code, a user identifier, a CVV (card verification value), an expiration date, etc. An authorization request message may also comprise "interaction data," such as any information associated with a current interaction, such as an interaction value, a time stamp, resource provider identifier, resource provider location, etc., as well as any other information that may be utilized in determining whether to authorize an interaction. An authorization request message according to some embodiments may comply with ISO 8583, which is a standard for systems that exchange electronic transaction information associated with a payment made by a user using a payment device or payment account.

An "authorization response message" may be a message reply to an authorization request message. The authorization response message may be generated, for example, by a secure data server, an issuing financial institution, a payment processing network, a processing gateway, etc. The authorization response message may include, for example, one or more of the following status indicators: Approval—interaction was approved; Decline—interaction was not approved; or Call Center—response pending more information, resource provider must call the toll-free authorization phone number. The authorization response message may also include an authorization code, which may be a code that an authorizing entity returns in response to an authorization request message in an electronic message to the resource provider's access device that indicates approval of the interaction. The code may serve as proof of authorization.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

A "public key" may include a cryptographic key that that forms a public key of a public/private key pair. The public key may be designed to be shared (e.g., transmitted between entities) and may be configured such that any information encrypted with the public key may only be decrypted using a private key associated with the public key.

A "private key" may include a cryptographic key that forms a private key of a public/private key pair. A private key may be used to decrypt data encrypted with a public key.

A "key share" may be a portion of a cryptographic key. A cryptographic key may be divided into two or more key shares. From a single key share, the original cryptographic key may not be recoverable. The original cryptographic key may be recoverable from some or all of the key shares. For example, a key may be split into n key shares such that the key is recovered when a threshold number t of key shares are added together.

"Plaintext" may include text that is in plain form. For example, plaintext can refer to text that is readable by a human or computer without any processing, such as the phrase "hello, how are you?" Plaintext may also refer to text that is in unencrypted form. Numbers or other symbols may also qualify as plaintext.

"Ciphertext" may include text that is in encrypted form. For example, ciphertext can refer to text that must be decrypted before it can be interpreted by a human or a computer. Ciphertext may be generated by a cryptosystem, such as RSA or AES.

A "multi-party computation" may include a computation performed by multiple parties. Each party may contribute some inputs to the computation. For example, two parties may each possess a key share, and may collectively perform encryption using the two key shares.

"Secure multi-party computations" may include multi-party computations that are secure. In many cases, a secure multi-party computation may refer to a multi-party computation in which the parties do not share their inputs with one another. For example, two parties may each possess a key share, and may collectively perform encryption using the two key shares, without revealing their respective key shares to the other party.

"Partial decryption" may be decryption of an encrypted value that changes the encrypted value but does not reveal the plaintext that has been encrypted. Partial decryption include a decryption that was done with a key share. With a partial decryption, the encrypted information may still be ciphertext. A partially decrypted may not be identifiable as decrypted.

FIG. 1 shows a block diagram of a system 100 according to embodiments. The system 100 may comprise a resource provider computer 110 associated with a resource provider, an interaction processing server 120, a location server computer, and a mobile device 140. The mobile device 140 may comprise a location application 145. Any of the devices in FIG. 1 may be in communication via a suitable communications network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The resource provider computer 110 may allow a resource provider to interact with other entities. The resource provider computer 110 may store a resource provider identifier (e.g., a merchant ID). The resource provider computer 110 may have an associated location (e.g., GPS coordinates, a postal address). The resource provider computer 110 can be an access device (e.g., a point of sale terminal, an access point for a secure area), or may be associated with a plurality of access devices. The resource provider computer 110 may store a physical location of an access device (e.g., as GPS coordinates, latitude and longitude, etc.). In some embodiments, the resource provider computer 110 may be associated with a plurality of access devices with the same location. For example, there may be a plurality of POS terminals inside of a store of the resource provider that all share the location of the store.

The interaction processing server 120 may be a server computer that can process interactions. The interaction processing server 120 may authorize or initiate authorization of interactions between the resource provider computer 110 and the mobile device 140. Additionally, the interaction processing server 120 may have risk analysis capabilities. In some embodiments, the interaction processing server 120 may be an authorizing entity computer. In other embodiments, the interaction processing server 120 may be a payment processing network computer. The interaction processing server 120 may maintain a database of resource provider locations. The database may associate resource provider identifiers with resource provider locations.

The location server computer 130 may be a server computer that manages location data from mobile devices. Managing location data may include, for example, storing encrypted location data, decrypting location data, and sending location data. In some embodiments, the location server computer 130 may be part of a payment processing network. The location server computer 130 may have cryptographic key generation capabilities.

The mobile device 140 may be a device associated with a user (not shown). Examples of a mobile device 140 may include a cell phone, smartwatch, wearable device, etc. The mobile device 140 may have a location system to determine a location of the mobile device 140 (e.g., by GPS, by cellular triangulation). Location application 145 may encrypt location data of the mobile device 140 and send the encrypted locations to the location server computer 130. At some point, the mobile device 140 may be used to perform one or more interactions with a resource provider computer 110 associated with the resource provider. For example, the user may use the mobile device 140 to pay for goods at an access device of the resource provider. As another example, the mobile device 140 may also be used to enter a secure area controlled by the resource provider.

Figure 2:
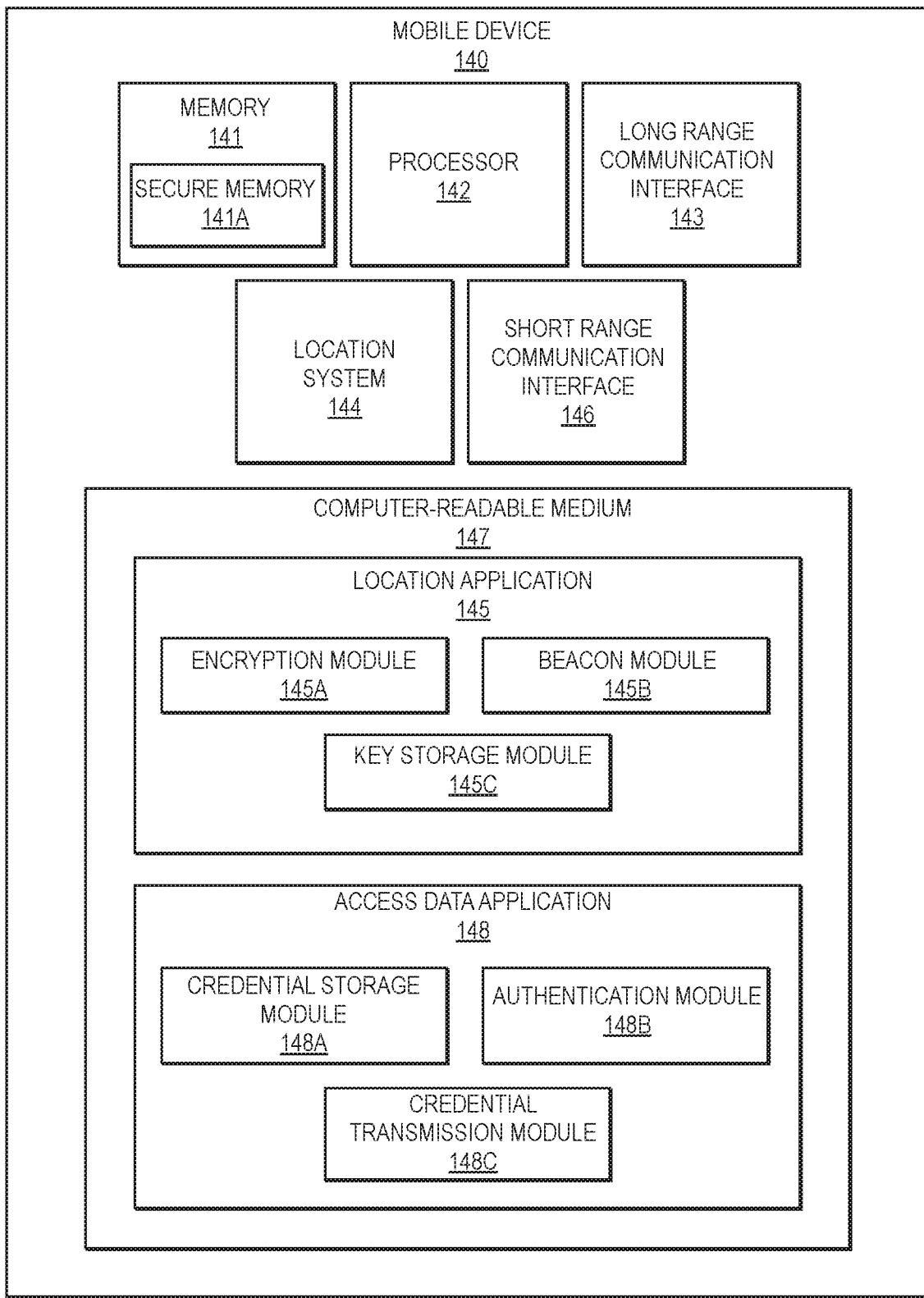
FIG. 2 is a block diagram of a mobile device according to embodiments.

FIG. 2 is a block diagram of a mobile device 140 according to embodiments. The mobile device 140 may comprise a memory 141, a processor 142, a long range communication interface 143, a location system 144, a short range communication interface 146, and a computer-readable medium 147. The computer-readable medium 147 may comprise a location application 145 and an access data application 148. The location application 145 may comprise an encryption module 145A, a beacon module 145B, and a key storage module 145C. The access data application 148 may comprise an credential storage module 148A, an authentication module 148B, and an access data transmission module 148C.

The memory 141 may be implemented using any combination of any number of non-volatile memories (e.g., flash memory) and volatile memories (e.g., DRAM, SRAM), or any other non-transitory storage medium, or a combination of media. The memory 141 may comprise a secure element with secure memory 141A. The secure memory 141A may store cryptographic keys (e.g., a public key).

The processor 142 may be implemented as one or more integrated circuits (e.g., one or more single core or multicore microprocessors and/or microcontrollers). The processor 142 may be used to control the operation of the mobile device 140. The processor 142 can execute a variety of programs in response to program code or computer-readable code stored in memory 141. The processor 142 may include functionality to maintain multiple concurrently executing programs or processes.

Long range communication interface 143 may include one or more RF transceivers and/or connectors that can be used by mobile device 140 to communicate with other devices and/or to connect with external networks. The long range communication interface 143 may be configured to communicate with a remote base station and a remote cellular or data network, over the air.

Location system 144 may be configured to enable mobile device 140 to determine its location (e.g., as GPS coordinates, latitude and longitude, a postal location etc.). In some embodiments, location system 144 may comprise a GPS receiver. In other embodiments, location system 144 may use cellular towers to triangulate a location. Location system 144 may determine the position of the mobile device 140 to a suitable level of precision. For example, location system 144 may determine a location to within 100 m.

Short range communication interface 146 may be configured to communicate with external entities through a short range communication medium (e.g. using Bluetooth, Wi-Fi, infrared, NFC, etc.). Short range communication interface 146 may be used, for example, to transfer credentials from the mobile device 140 to an access device for a contactless payment or at an entry point of a secure area.

Computer-readable medium 147 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 147 may be any combination of such storage or transmission devices. The computer-readable medium 147 may comprise a plurality of applications, including location application 145 and access data application 148. In some embodiments, location application 145 and access data application 148 may be part of the same application. For example, they may be multiple functionalities of a mobile wallet application.

Location application 145 may be associated with the location server computer 130. The mobile device 140 may download location application 145 from an application service (e.g., an app store). The location application 145 may be an application of the location server computer 130. In some embodiments, the location application 145 may be part of an access application (e.g., a payment application). The location application 145 may comprise a plurality of modules.

Encryption module 145A, in conjunction with the processor 142, may encrypt information using a cryptographic key. In particular, the encryption module 145A, in conjunction with the processor 142, may use a public key from the location server computer 130 to encrypt a location of the mobile device 140 from the location system 144. The encrypted location may then be stored on the mobile device 140.

Beacon module 145B, in conjunction with the processor 142, may periodically send information to the location server computer 130. The beacon module 145B, in conjunction with the processor 142, may send encrypted locations to location server computer 130. Encrypted locations may also be sent with a user identifier and/or mobile device identifier, and a time stamp. In some embodiments, the beacon module 145B, in conjunction with the processor 142, may send an encrypted location to the location server computer 130 when the user initiates a payment with the access data application 148. In other embodiments, the beacon module 145B, in conjunction with the processor 142, may send an encrypted location every five minutes, every hour, every three hours, etc. The frequency of transmission may be configured. For example, the beacon module 145B, in conjunction with the processor 142, may increase the frequency or begin sending locations when the user uses the mobile device 140 in an interaction. Some access devices (e.g., a point of sale terminal, a key card terminal) and/or resource provider computers may use a geofence to alert mobile device 140 when it is within range.

Key storage module 145C, in conjunction with the processor 142, may store cryptographic keys in a memory. In particular, the key storage module 145C may store a public key from the location server computer 130. The cryptographic keys may be stored in secure memory 141A.

Access data application 148 may be an application that allows the user of the mobile device 140 to access a resource. In some embodiments, the access data application 148 may be a mobile wallet. In other embodiments, access data application 148 may store credentials to enter a secure area.

Credential storage module 148A, in conjunction with the processor 142, may store access data. Access data may include, for example, credentials such as payment credentials (e.g., a PAN, an account number, a token) or access credentials (e.g., an access code, a ticket number, a token). In some embodiments, access data may be provisioned onto mobile device 140, such by resource provider or issuer. In other embodiments, a user may enter the access data, such as by typing in payment card information. Access data may be stored in secure memory 141A.

Authentication module 148B, in conjunction with the processor 142, may authenticate users. For example, a user may be authenticated by authentication module 148B prior to using access data application 148 in an interaction, entering new access data, or opening access data application 148. Authentication module 148B, in conjunction with the processor 142 may request that users enter data such as a password, PIN, or biometric data, may then compare the data to previously stored data. If the data matches the previously stored data, the user may be authenticated. In some embodiments, the authentication module 148B may send the data to an authenticating entity (e.g., an issuer) and may receive an indication that the user has been authenticated.

Access data transmission module 148C, in conjunction with the processor 142, may transmit access data (e.g., to an access device, a resource provider computer) as part of an interaction. For example, access data transmission module 148C may send access credentials to an access device using a short range communication medium (e.g., NFC, Bluetooth). As another example, access data transmission module 148C may display payment credentials on mobile device 140 in the form of a QR code or barcode that can be scanned by an access device.

Computer-readable medium 147 may comprise code, executable by the processor 142, for implementing a method including sending, to the location server computer, a key request message. The method then includes receiving, from the location server computer, a public key, wherein the public key is part of a private key and public key pair and storing, by the mobile device, the public key. The method also includes generating, by a location system, a location of the mobile device. The method also includes encrypting the location of the mobile device with a public key to form an encrypted location and sending the encrypted location to the location server computer.

Figure 3:
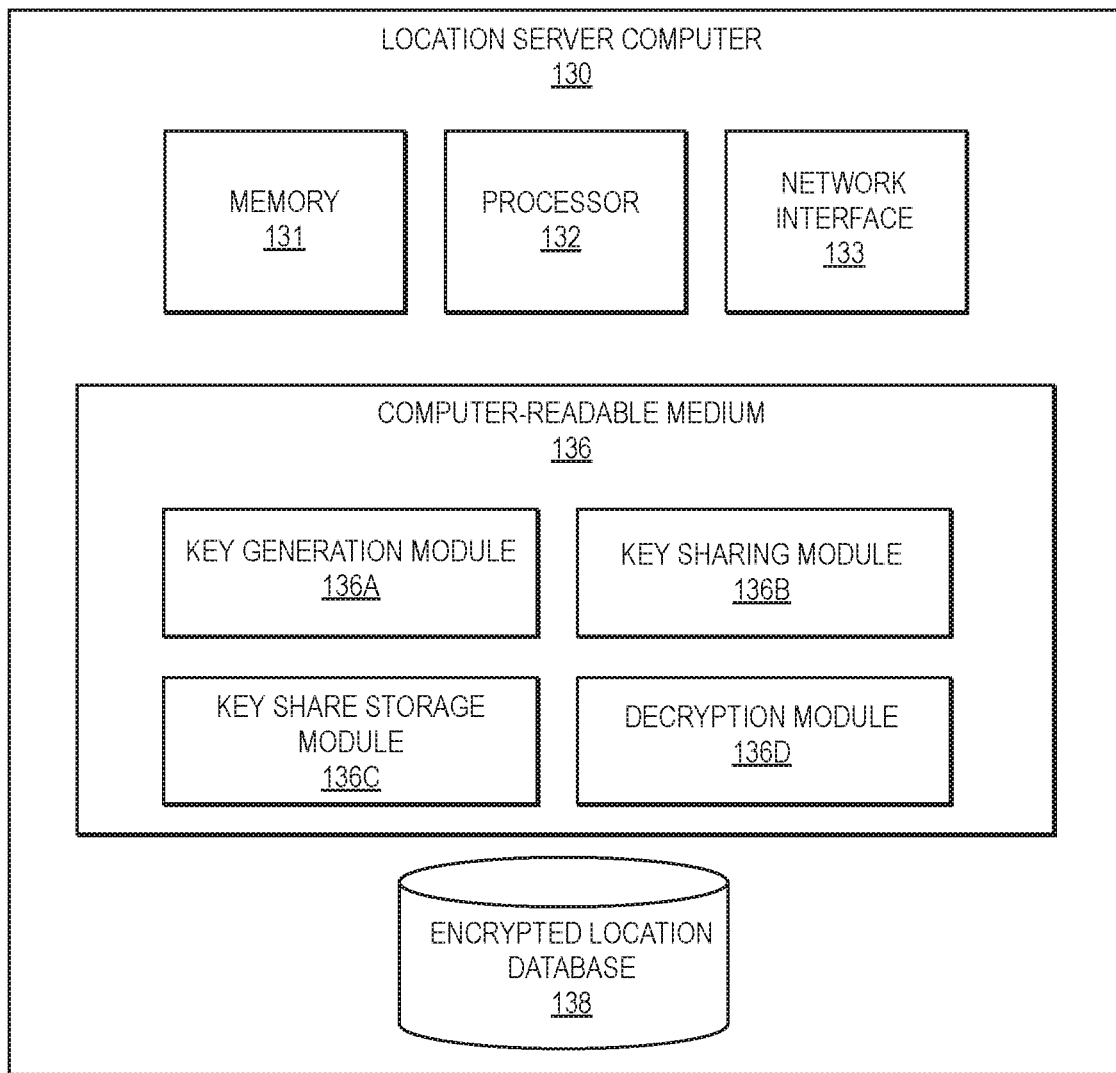
FIG. 3 is a block diagram of a location server computer according to embodiments.

FIG. 3 shows a block diagram of a location server computer 130 according to embodiments. The location server computer 130 may comprise a memory 131, a processor 132, and a computer-readable medium 136. These components may be similar to or different than the corresponding components in the mobile device 140 of FIG. 2.

Location server computer 130 may also comprise a network interface 133. Computer-readable medium 136 may store code executable by the processor 132 for implementing some or all of the functions of location server computer 130 described herein. For example, computer-readable medium 136 may include a key generation module 136A, a key sharing module 136B, a key storage module 136C, and a decryption module 136D. The location server computer 130 may also include or be in communication with an encrypted location database 138.

Network interface 133 may be configured to connect to one or more communication networks to allow location server computer 130 to communicate with other entities such as mobile device 140, interaction processing server 120, etc. For example, communication with the interaction processing server 120 can be direct, indirect, and/or via an API.

Key generation module 136A, in conjunction with the processor 132, may generate cryptographic keys. The keys may be generated for an RSA cryptosystem (i.e., the keys may comprise an exponent and a modulus). The key generation module 136A, in conjunction with the processor 132, may generate a private and public key pair. The key pair may be generated in response to a key request message. Additionally, or alternatively, the key generation module 136A, in conjunction with the processor 132, may generate a plurality of keys to be provisioned at a later time. In some embodiments, the a key pair may be generated for each interaction processing server. In other embodiments, a key pair may be generated for each user.

Key sharing module 136B, in conjunction with the processor 132, may split cryptographic keys (in particular, private keys) into a plurality of key shares. For example, key sharing module 136B, in conjunction with the processor 132, may generate a random number that is the same length as the private key. Then the random number and the private key may be combined (e.g., by subtracting the random number from the private key). The result of the combination and the random number may each be a key share. After generating the key shares, the key sharing module 1366, in conjunction with the processor 132, may delete the private key from memory.

Key storage module 136C, in conjunction with the processor 132, may store cryptographic keys. The key storage module 136C may store public keys, private keys, and private key shares. After storing private key shares, the key storage module 136C, in conjunction with the processor 132, may delete a private key that the private key shares are derived from. The key storage module 136C may also store a user identifier, mobile device identifier, and/or an identifier of an interaction processing server that the cryptographic keys are shared with. For example, a public key may be stored with a plurality of user identifiers indicating users that have received the public key. A private key share may be stored with an identifier of the interaction processing server that has a corresponding share of the private key.

Decryption module 136D, in conjunction with the processor 132, may decrypt encrypted messages. The decryption module 136D may use cryptographic keys stored in the key storage module 136C. In embodiments, the decryption module 136D, in conjunction with the processor 132, may use a private key share to partially decrypt a message.

Encrypted location database 138 may store encrypted locations from mobile devices. The encrypted location database 138 may store encrypted locations with a user identifier and/or a mobile device identifier, and a time stamp.

Figure 4:
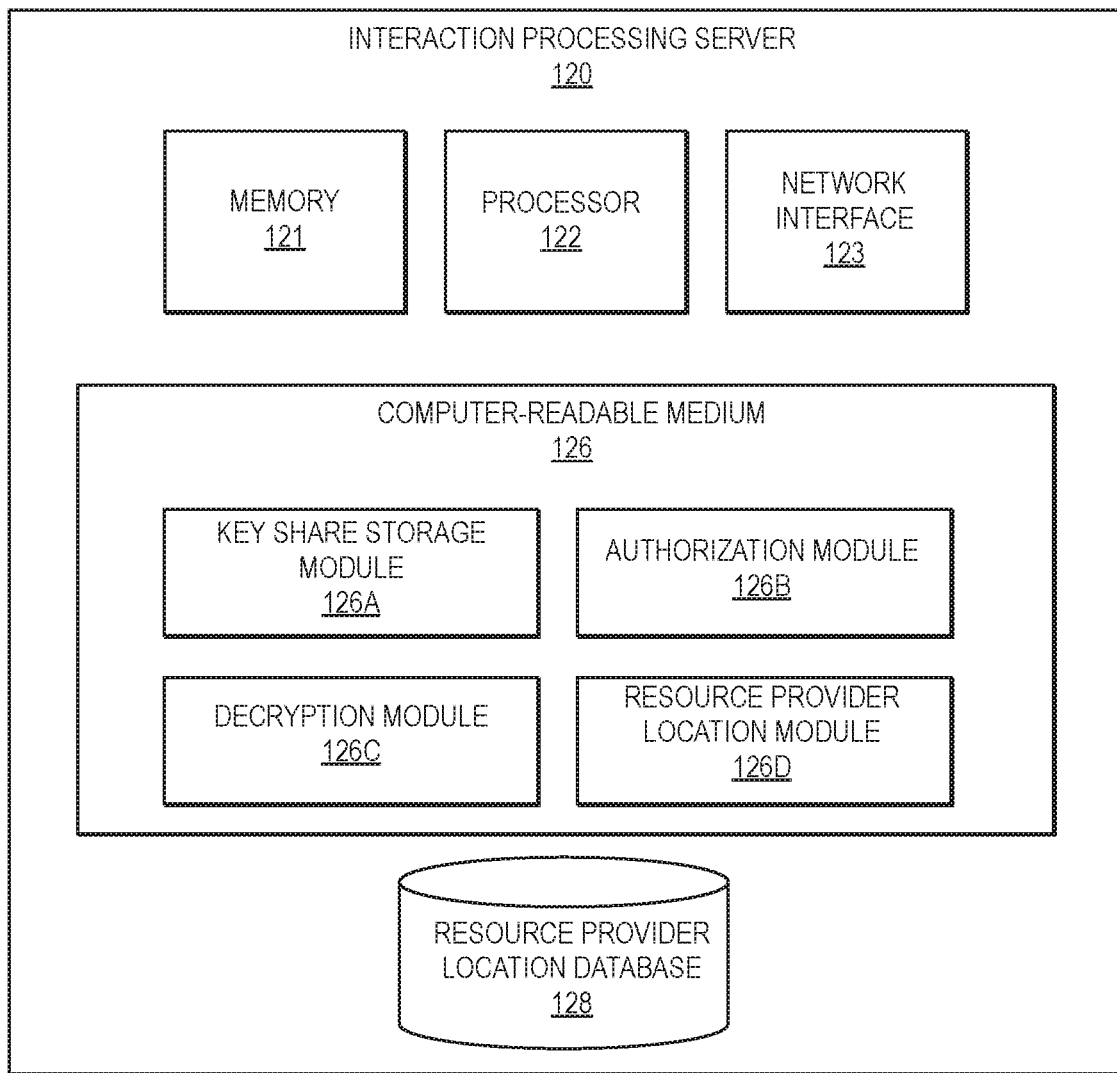
FIG. 4 is a block diagram of an interaction processing server according to embodiments.

FIG. 4 shows a block diagram of an interaction processing server 120. The interaction processing server 120 may comprise a memory 121, a processor 122, a network interface 123, and a computer-readable medium 126. These components may be similar to or different than the corresponding components in the location server computer 130 of FIG. 3. Computer-readable medium 126 may store code executable by the processor 122 for implementing some or all of the functions of interaction processing server 120 described herein. For example, computer-readable medium 126 may include a key share storage module 126A, an authorization module 126B, a decryption module 126C, and a resource provider location module 126D. The interaction processing server 120 may also include or be in communication with a resource provider location database 128.

Key share storage module 126A, in conjunction with the processor 122, may store key shares. The key share storage module 126A may store private key shares received from location server computer 130. In some embodiments, the key share storage module 126A may also store an identifier associated with each key share. For example, the interaction processing server 120 may receive two private key shares from location server computer 130 corresponding to two private keys. During a subsequent decryption process, an encrypted message may be sent with an identifier of a key share, indicating which private key share can be used to decrypt the encrypted message.

Authorization module 126B, in conjunction with the processor 122, may authorize interactions. Authorization may depend in part on a mobile device location and a resource provider location. For example, the authorization module 126B may authorize an interaction if the mobile device location is within a particular radius of the resource provider location. The authorization may also depend on business rules, such as risk analysis, interaction details, etc. Additionally, or alternatively, authorization module 126B, in conjunction with the processor 122, may initiate authorization of interaction. In initiating authorization, authorization module 126B may send interaction information to an authorizing entity (e.g., an issuer).

Decryption module 126C may operate in a similar or different way to decryption module 136D. Decryption module 126C may use key shares stored in key share storage module 126A. Decryption module 126C, in conjunction with the processor 122, may also multiply a first partially decrypted location and a second partially decrypted location to form a decrypted location.

Resource provider location module 126D, in conjunction with the processor 122, may determine a resource provider location. The resource provider locations may be stored in resource provider location database 128. The resource provider location module 126D may use a resource provider identifier to retrieve a location of the resource provider. The resource provider location module 126D may also receive an access device identifier (e.g., an identifier of a point of sale terminal). This may be used in situations, for example, where a resource provider has a plurality of physical stores, and each store may have a separate access device.

Resource provider location database 128 may store locations of resource providers, and access device locations. Location data in resource provider location database 128 may be, for example, GPS coordinates, latitude and longitude coordinates, or postal addresses. Location data may be stored with a resource provider identifier and/or an access device identifier. For example, an access device location may be stored with an access device identifier and a resource provider identifier of the resource provider that operates the access device. Some access devices and resource providers may be mobile (e.g., a tablet computer with POS software), and their locations may be stored with time stamp.

Figure 5:
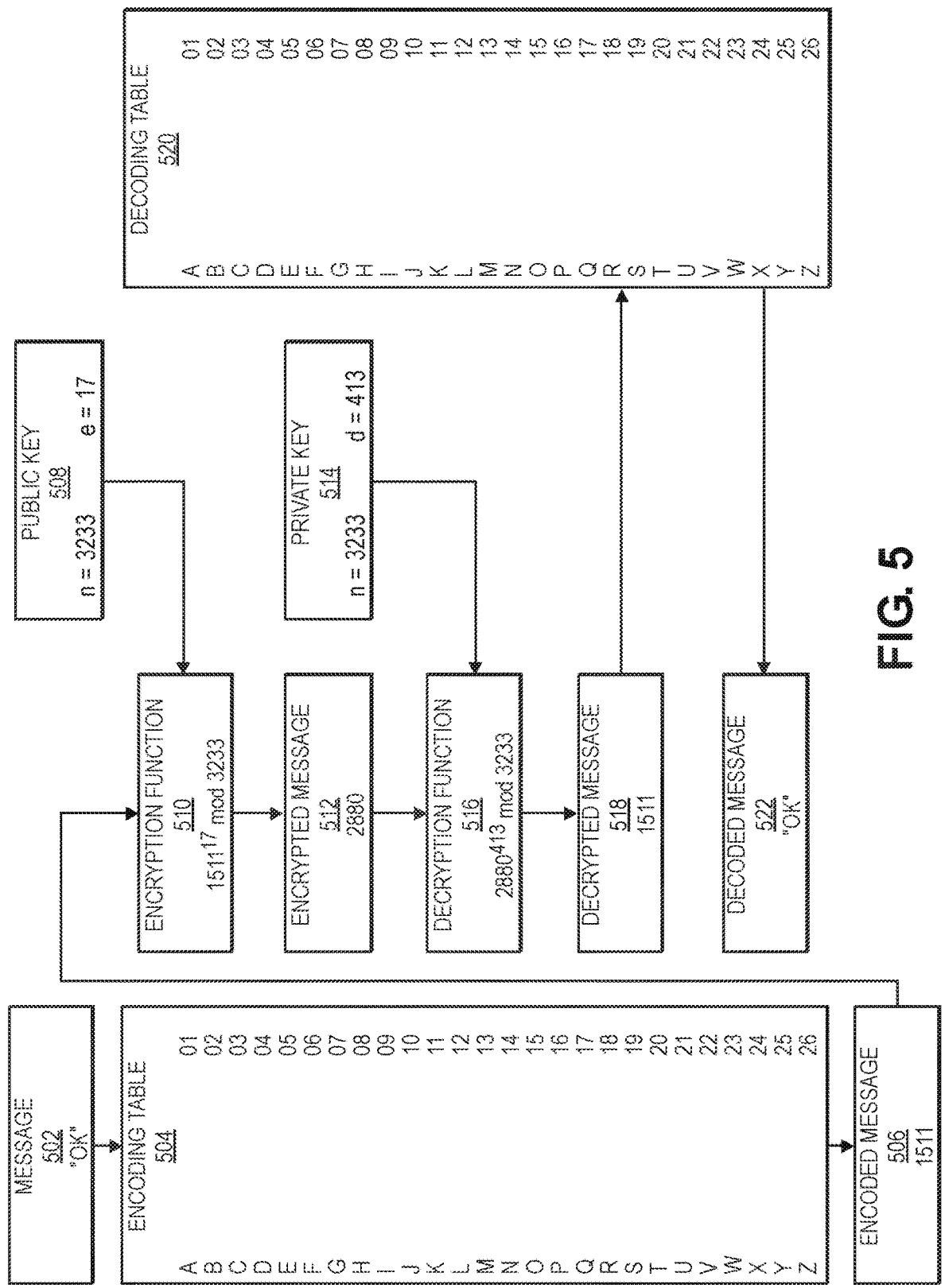
FIG. 5 is a flow diagram of RSA encryption and decryption.

FIG. 5 shows a flowchart diagram of an asymmetric encryption process that may be useful in understanding some embodiments. FIG. 5 details how a message 502 "OK" may be encoded and encrypted using a public key, before being decrypted using a private key and decoded, according to the RSA cryptosystem. It is appreciated that variations on the process below may be used in embodiments.

Message 502 can be encoded using an encoding table such as encoding table 504. Encoding table 504 pairs each letter with its alphabetical index in the English alphabet. "O" is the $15^{th}$ letter in the English alphabet, and "K" is the $11^{th}$ letter. Using encoding table 504, "OK" can be encoded as 1511 (encoded message 506).

The RSA cryptosystem can use two distinct cryptographic keys, a public key and a private key. Messages encrypted using the public key can be decrypted using the private key. The public key and the private key each comprise two values, a modulus and an exponent. The modulus is a product of two prime numbers. In FIG. 5, the modulus n is 3233. The public exponent e and the private exponent d are selected based on the modulus. Typically, the public exponent e is selected to be less than and coprime with Carmichael's totient function, and the private exponent d is the modular multiplicative inverse of e. In FIG. 5 the public exponent e is 17 and the private exponent d is 413.

The encoded message 506 along with public key 508 are used as an input to the encryption function 510. The encoded message 506 "1511" is raised to the power of the public exponent e=17, and the modulus of the result and n=3233 is determined. The result is the encrypted message 512, 2880.

The encrypted message 512 can be decrypted using the decryption function 516 and private key 514. The decryption function 516 is similar to the encryption function 510. The encrypted message 512, 2880 is raised to the power of the private exponent d=413, and the modulus of the result and n=3233 is determined. The result is the decrypted message 518, 1511. Notably, the decrypted message 518 is the same as encoded message 506, indicating that the encryption and decryption process was successful.

The decrypted message 518 can be decoded using a decoding table 520, which pairs alphabetic indexes to the corresponding letter of the English alphabet. "15" corresponds to the letter "O" and "11" corresponds to the letter "K." The resulting decoded message 522 is "OK," which is the same as message 502.

Embodiments can use multi-party computations with RSA encryption to decrypt information, such as location data. RSA decryption can use exponents to decrypt the encrypted message. For example, with an encrypted message c and a private key d, the decrypted message t can be found using the equation $$t = c^d \pmod{q}$$

for some modulus q.

The private key d can be divided into two private key shares, $d_1$ and $d_2$, such that $d = d_1 + d_2$. The first private key share $d_1$ can be used to partially decrypt the encrypted message c to get a first partially decrypted message $c_1$, and the second private key share $d_2$ can be used to partially decrypt the encrypted message c to get a second partially decrypted message $c_2$ using the equations $$c_1 = c^{d_1} \pmod{q}$$

$$c_2 = c^{d_2} \pmod{q}$$

for the modulus q. Note that $c_1$ and $c_2$ are not decrypted messages and may not be identifiable as partially decrypted (e.g., they may appear to be random values).

Once the first and second partially decrypted messages have been computed, they can be multiplied together.

$$c_1 * c_2 = c^{d_1} * c^{d_2} = c^{(d_1+d_2)} = c^d \pmod{q}$$

Multiplying the first and second partially decrypted messages is thus equivalent to using the original private key to decrypt the message.

Decryption with two private key shares according to embodiments may then proceed as follows. The private key 514 may be split into two or more private key shares. In particular, embodiments may use a key sharing algorithm such that the private key shares sum to the private key 514. For example, a random number may be generated that is less than the private key 514. As one example, the random number 154 may be generated. 154 may be the first private key share. The second private key share may then be the difference of the private key and the first private key share, 413−154=259. Independently, the first and second private key shares may appear to be random and have no connection to the private key.

In a first decryption step, the encrypted message 512 may be partially decrypted with the first private key share. The encrypted message 512 and the first private key share may be inputs for decryption function 516. The output of the decryption function 516 is then $2880^{154} \bmod 3233 = 1599$, resulting in a first partially decrypted message 1599. Note that the partially decrypted message is not a fully decrypted message, as 1599 cannot be meaningfully decoded with decoding table 520.

A second partial decryption can then be performed. The encrypted message 512 and the second private key share may be inputs for decryption function 516. The output of the decryption function 516 is then $2880^{259} \bmod 3233 = 745$, resulting in a second partially decrypted message 745. The partial decryptions can then be multiplied together, resulting in $(1599*745) \bmod 3233 = 1511$, or the decrypted message 518. The decrypted message 518 can then be decoded using decoding table 520 to give the decoded message 522.

In some embodiments, the private key shares may be periodically refreshed (e.g., daily, after every decryption). This can increase security as two private key shares stolen at different times (e.g., before and after the keys are refreshed) may not be usable by an attacker. One possible method for refreshing private key share is described. The entities with shares of a private key (e.g., a location server computer and an interaction processing server) can agree on a random value, such as by using cryptographic pseudorandom generator. One entity (e.g., the location server computer) can add the random value to their private key share, and the other entity (e.g., the interaction processing server) can subtract the random value from their private key share. The private key shares will thus be different, but still sum to the private key and can thus be used to decrypt messages.

Figure 6:
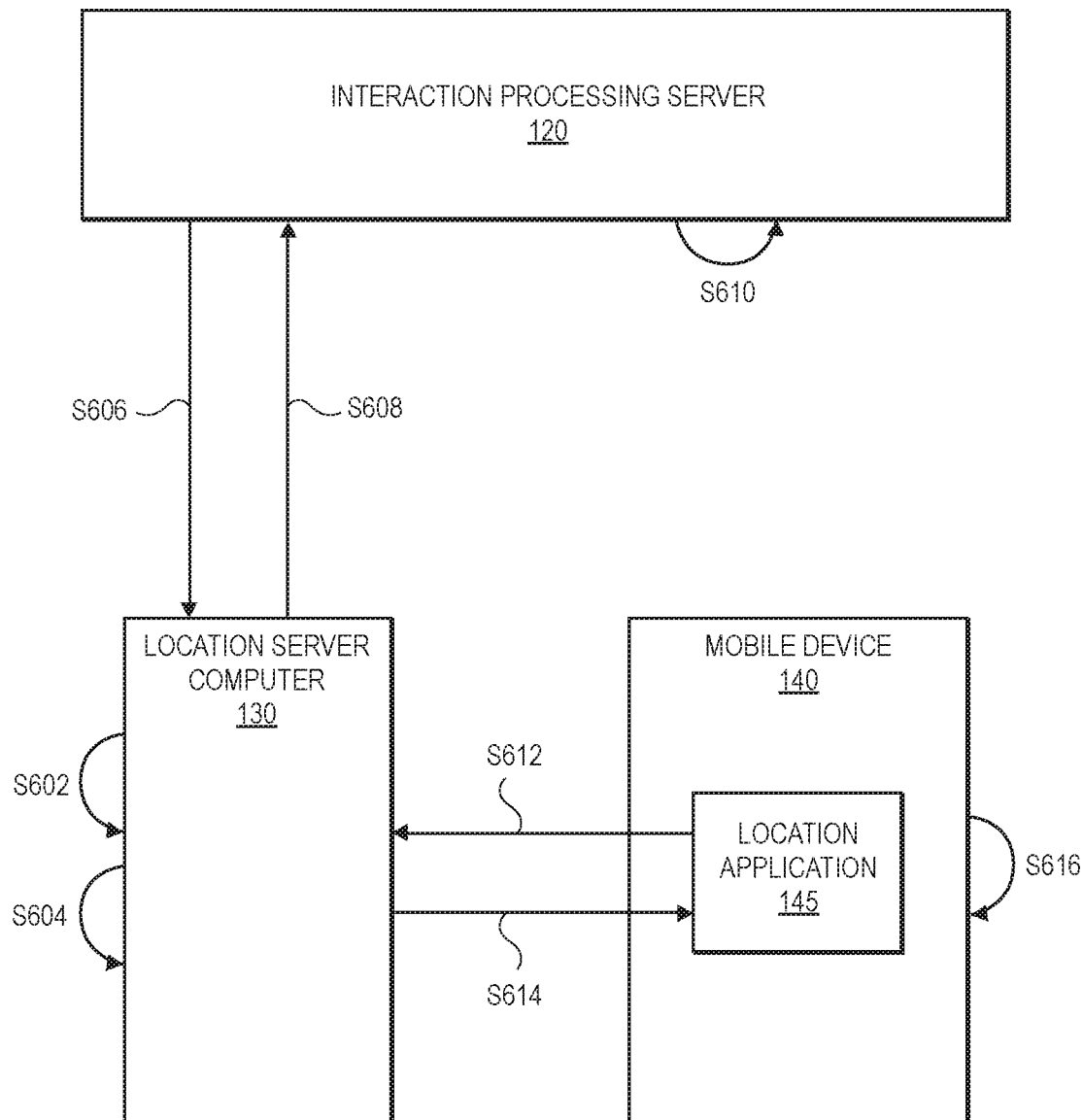
FIG. 6 is a process flow of key generation and provisioning according to embodiments.

FIG. 6 shows a flow diagram of key generation and provisioning according to embodiments. Keys may be provisioned to each device (e.g., mobile device 140, interaction processing server 120) as part of a one-time registration process. In some embodiments, devices may be provisioned with new keys periodically, such as after an attack is discovered or as part of routine security updates.

In step S602, location server computer 130 may generate a public key and a private key. The public key and the private key may generated according to an RSA cryptosystem. In particular, the keys may each comprise a modulus and an exponent. In some embodiments, the location server computer 130 may generate a plurality of public key-private key pairs.

In step S604, the location server computer 130 may split the private key into a first private key share and a second private key share. The location server computer may then store the public key and the first private key share. The private key may then be deleted from memory.

The following is intended only as a non-limiting example of generating key shares from a cryptographic key. It can be understood that there are many other appropriate methods that may be employed with embodiments of the present disclosure. The location server computer 130 can generate a random or pseudorandom number. The location server computer 130 can use this random or pseudorandom number as either the first or second private key share. The location server computer 130 can subtract the random or pseudorandom number from the private key. The difference of the private key and the random or pseudorandom number can be used as the other key share (e.g., the second private key share).

In step S606, location server computer 130 may receive a key request message from an interaction processing server 120. They key request message may comprise an identifier of the interaction processing server 120. The key request message may also include a cryptogram or other indication of the authenticity of the interaction processing server 120. Additionally, or alternatively, the location server computer 130 may communicate with the interaction processing server 120 over a secure channel.

In step S608, in response to the key request message, the location server computer 130 may transmit the second private key share to the interaction processing server 120. In some embodiments, the location server computer 130 may also transmit an identifier of the key share associated with the private key. This may be used, for example, to identify a particular key share if the location server computer 130 has sent other key shares to interaction processing server 120. After transmitting the second private key share to the interaction processing server 120, the location server computer 130 can delete the second private key share from memory. The location server computer 130 may also store the identifier of the interaction processing server 120 with the first private key share.

In step S610, the interaction processing server 120 may store the second private key share. In some embodiments, the interaction processing server 120 may also store an identifier of the key share.

In step S612, the location server computer 130 may receive a key request message from a mobile device 140 operated by a user. The key request message may be sent by a location application 145 on the mobile device 140, and may be sent as part of a registration process. In some embodiments, the key request message may automatically be sent when the location application 145 is installed on the mobile device 140. The key request message may comprise an identifier of the mobile device 140 (e.g., a phone number, an MS ID) and/or a user identifier.

In step S614, in response to the key request message, the location server computer 130 may transmit the public key to the mobile device 140. The location server computer 130 may also store the identifier of the mobile device 140.

In step S616, the mobile device 140 may store the public key. The mobile device 140 may store public key in secure memory. The location application 145 may then complete registration.

Figure 7:
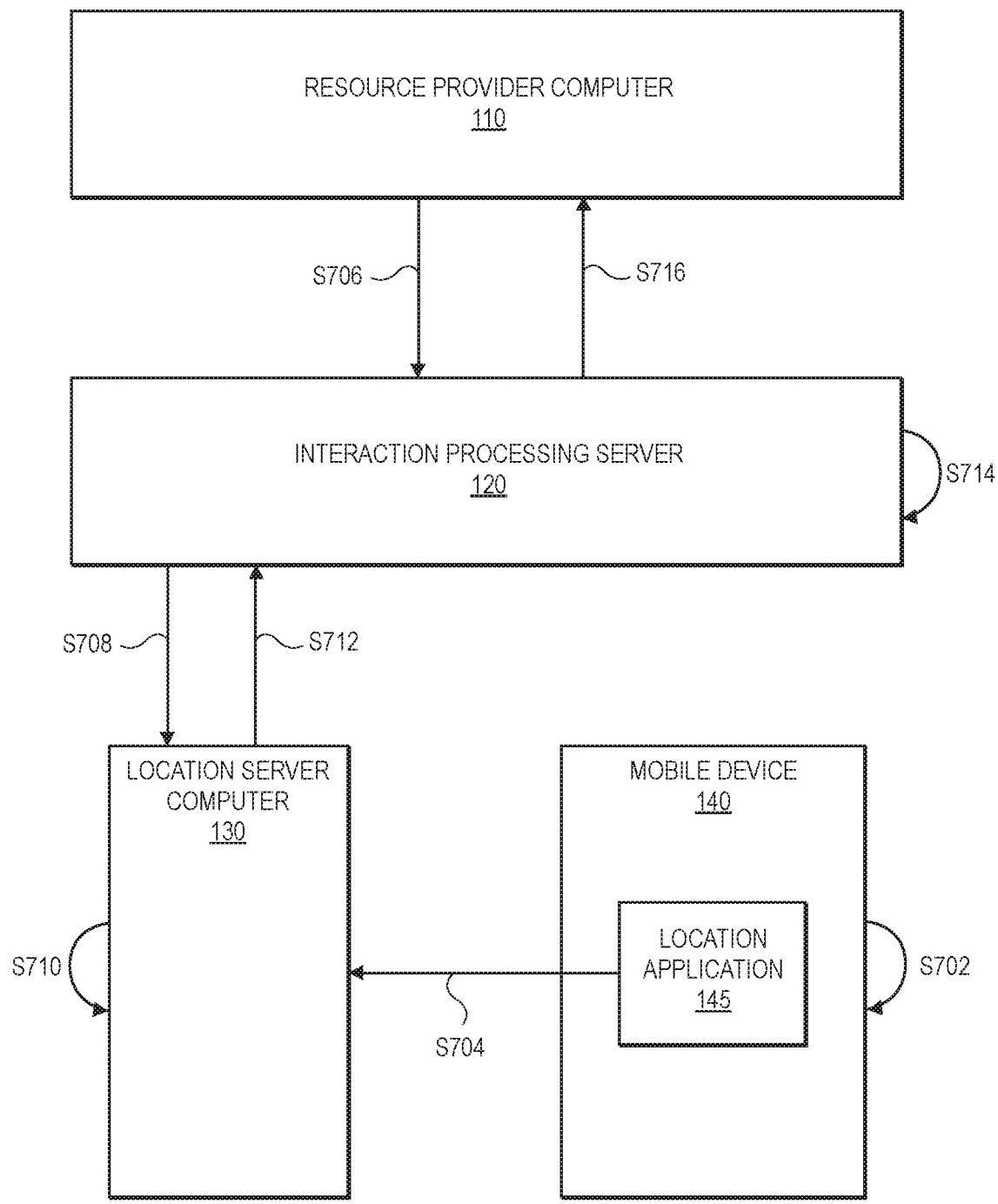
FIG. 7 is a process flow of location decryption according to embodiments.

FIG. 7 shows a flow diagram of location decryption according to embodiments. Location decryption may be performed whenever a recent location of a user is requested by interaction processing server 120.

In step S702, a mobile device 140 may determine a location. For example, the mobile device 140 may determine GPS coordinates or a latitude and longitude, or determine a location based on wireless signals. The location may be determined every hour, every 5 minutes, etc. In some embodiments, the mobile device 140 may determine a location after initiating an interaction with an access device of a resource provider. In some embodiments, the mobile device 140 may determine its location more frequently when in certain locations. For example, the mobile device 140 may typically determine its location every hour, but may increase the frequency to every 3 minutes when within 100 meters of a particular resource provider. A geofence may be used in some embodiments to alert the mobile device 140 when it is within range of a resource provider.

The mobile device 140 may then encrypt the location using a public key received from the location server computer 130, such as in S614 of FIG. 6, to form an encrypted location. For example, the mobile device 140 may raise a numerical representation of the location to the power of the public key, according to an RSA cryptosystem. The mobile device 140 may then send the encrypted location to the location server computer 130. The mobile device 140 may also send a time stamp of the encrypted location to the location server computer 130.

In step S704, a location server computer 130 may receive the encrypted location from the mobile device 140. Encrypted locations may be received periodically (e.g., every hour, every 5 minutes). The location server computer 130 may then store the encrypted location in an encrypted location database. The encrypted location may be stored with the mobile device identifier (or user identifier) and time stamp.

In step S706, an interaction processing server 120 may receive an authorization request message from a resource provider computer 110 for an interaction between the user and resource provider. The interaction may be, for example, a payment transaction (e.g., an in-person purchase) or an access interaction (e.g., entering a secure area). The authorization request message may comprise interaction information (e.g., a time stamp, an interaction type, an interaction value), a user identifier, and a resource provider identifier. In some embodiments, the authorization request message may comprise an access device identifier. The interaction processing server 120 may retrieve a location of the resource provider computer 110, for example, from a resource provider location database using the resource provider identifier or the access device identifier. In some embodiments, the authorization request message may include the location of the resource provider computer 110 or access device. This may be used, for example, if the access device is a portable device such as a tablet computer.

In step S708, the interaction processing server 120 may send a location request message to the location server computer 130. The location request message may be, for example, part of a payment transaction or an access interaction. The location request message may comprise the user identifier and/or an identifier of the mobile device 140. The location request message may also comprise the time stamp of the interaction.

In step S710, the location server computer 130 can retrieve the encrypted location (e.g., from an encrypted location database). In some embodiments, the location server, may retrieve the most recent encrypted location. In other embodiments, the location server computer 130 may use the time stamp of the interaction to retrieve the encrypted location closest in time to the interaction. The location server computer 130 may then partially decrypt the encrypted location with a first private key share to form a first partially decrypted location. For example, the encrypted location and the first private key share may be inputs for a decryption function, such as decryption function 516 of FIG. 5.

In step S712, the location server computer 130 may transmit a location response message with the encrypted location and the first partially decrypted location to the interaction processing server 120. The location server computer 130 may also send a time stamp of the encrypted location.

In step S714, the interaction processing server 120 can use the first partially decrypted location and the second private key share to form a decrypted location. First, the interaction processing server 120 may partially decrypt the encrypted location with the second private key share. For example, the encrypted location and the second private key share may be inputs for a decryption function, such as decryption function 516 of FIG. 5, resulting in a second partially decrypted location. The interaction processing server 120 may then multiply the first partially decrypted location and the second partially decrypted location, and may obtain the decrypted location using a modulus function as described above. The decrypted location may now be in plaintext.

In step S716, the interaction processing server 120 can initiate authorization of the interaction, based on at least the decrypted location. Initiating authorization may include sending information (e.g., interaction information, location matching results, risk analysis) to an authorizing entity, such as an issuer, to authorize the interaction. In some embodiments, the interaction processing server 120 can authorize the interaction. In other embodiments, the interaction processing server 120 can initiate an authorization of an interaction by informing the resource provider computer 110 that the resource provider location and the location of the mobile device 140 match. The resource provider computer 110 can then generate and transmit an authorization request message to an authorizing entity computer to authorize the interaction.

The interaction processing server 120 can initiate authorization when the resource provider location (e.g., resource provider computer location, access device location) corresponds to the (decrypted) location of the mobile device 140. Conversely, when the location of the mobile device is identified as being at a different location from the resource provider (e.g., in a different postal code or in a different city), the interaction processing server 120 may not initiate authorization. The interaction may still be authorized if the resource provider computer 110 and the mobile device 140 do not match, but are within a reasonable distance. For example, if the last location of the mobile device 140 is 30 miles away from the resource provider computer 110 and the time stamps are 1 hour apart, the interaction may still be authorized. Alternatively, if the locations are 500 miles apart with time stamps 1 hour apart, the interaction mat not be authorized as it is infeasible that the user had traveled that distance in that time.

Initiating authorization may also depend on other factors, such as risk analysis, fraud detection, and/or application of business rules. For example, an interaction may be declined if it at an unusual time (e.g., at 3 am) even if the location of the mobile device 140 corresponds to the resource provider location, as that may indicate that the mobile device 140 has been stolen. In some embodiments, the interaction processing server 120 may perform risk analysis of the interaction and then send the results of the risk analysis to an authorizing entity computer with the interaction information as part of initiating authorization.

The location based authentication and protection system described above can be used in a different environments.

Figure 8:
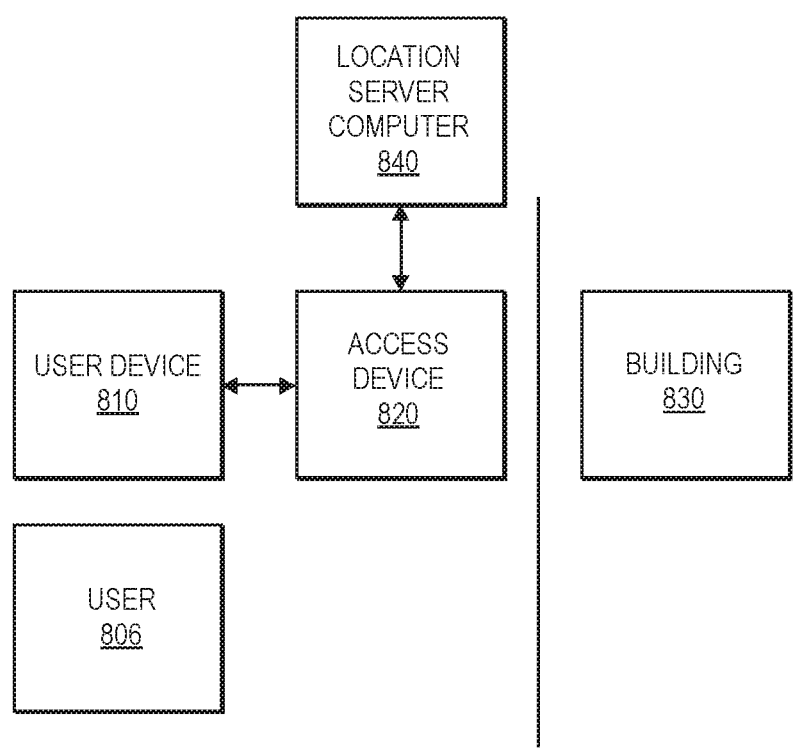
FIG. 8 is a block diagram illustrating a building access system according to embodiments.

FIG. 8 shows a block diagram of a building access system. FIG. 8 shows a user device 810 (which may be the same as the mobile device 140 in FIG. 1) operated by a user 806. The user device 810 has been provisioned with access data (e.g., access credentials, a token). The user device 810 can interact with the access device 820 and pass access data to the access device 820. The access device 820 may locally verify the received access data or it may communicate with a remotely located authentication server computer (not shown). Examples of an authentication server computer may include an interaction processing server. The remotely located authentication server computer may verify that the access data is authentic and may transmit a signal indicating this back to the access device 820.

The access device 820 may also communicate with a location server computer 840. The location server computer 840 can obtain the location of the user device 810 as described above, and may compare it to the location of the access device to determine if the user device 810 is proximate to the access device 820. If they are proximate to each other, then the user 806 is likely authentic. The data protection schemes described above can be used in this example as well and the details thereof need not be repeated here. Once the access device 820 authenticates the user 806 and the user device 810, the access device 820 may then proceed to let the user 806 enter the building 830.

Figure 9:
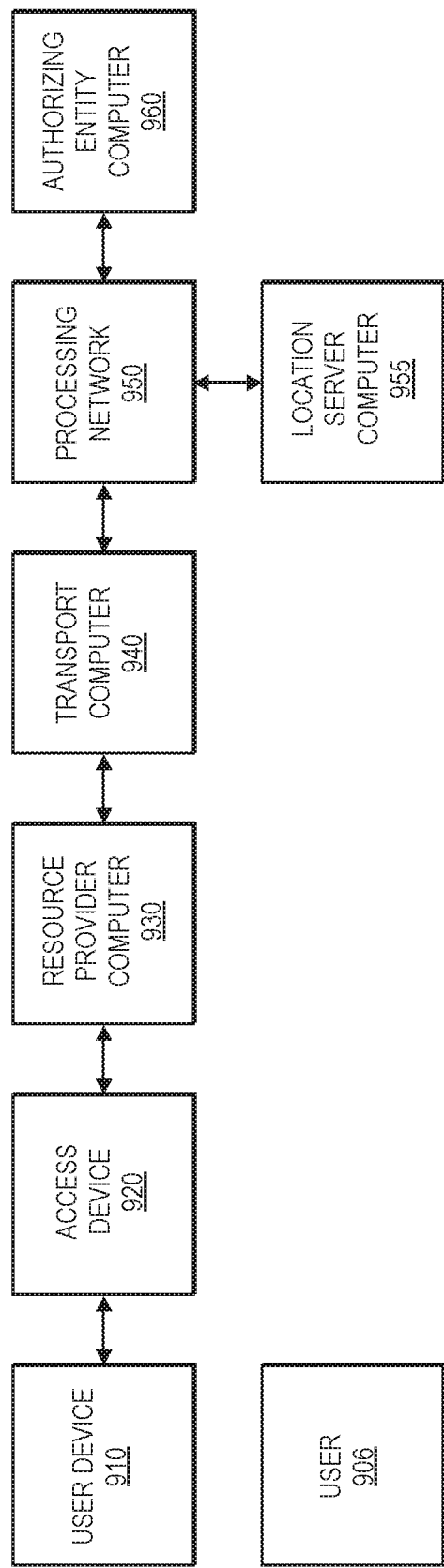
FIG. 9 is a block diagram illustrating a payment processing system according to embodiments.

FIG. 9 shows a block diagram of a transaction processing system (e.g., a payment processing system) that can use a user device with access data (e.g., payment credentials, a token). FIG. 9 shows a user 906 that can operate a user device 910. The user 906 may use the user device 910 to pay for a good or service at a resource provider such as a merchant. The merchant may operate a resource provider computer 930 and/or an access device 920. The merchant may communicate with an authorizing entity computer 960 operated by an issuer, via a transport computer 940 operated by an acquirer and a processing network 950 such a payment processing network.

A typical payment transaction flow using a user device 910 at an access device 920 (e.g., POS terminal) can be described as follows. A user 906 presents his or her user device 910 (which may be similar to the mobile device 140 in FIG. 1) to an access device 920 to pay for an item or service. The user device 910 and the access device 920 interact such that access data from the user device 910 (e.g., PAN, a payment token, verification value(s), expiration date, etc.) is received by the access device 920 (e.g., via contact or contactless interface). The resource provider computer 930 may then receive this information from the access device 920 via an external communication interface. The resource provider computer 930 may then generate an authorization request message that includes the information received from the access device 920 (i.e. information corresponding to the user device 910) along with additional transaction information (e.g., a transaction amount, merchant specific information, etc.) and electronically transmits this information to a transport computer 940. The transport computer 940 may then receive, process, and forward the authorization request message to a processing network 950 for authorization.

The processing network 950 can be similar to the interaction server computer 120 in FIG. 1, and the processing network 950 can communicate with a location server computer 955. The location server computer 955 can obtain the location of the access device 920 and the user device 910, and my compare the two locations as described above. If the two locations match, then the user 906 is likely an authentic user. The location data protection schemes described above can be used in this example as well and the details thereof need not be repeated here. If the user is likely authentic, then the transaction may proceed as indicated below. If the user is not authentic, then the processing network 950 could decline the transaction or transmit this information to the authorizing entity computer 960.

In general, prior to the occurrence of a credit or debit-card transaction, the processing network 950 has an established protocol with each issuer on how the issuer's transactions are to be authorized. In some cases, such as when the transaction amount is below a threshold value, the processing network 950 may be configured to authorize the transaction based on information that it has about the user's account without generating and transmitting an authorization request message to the authorizing entity computer 960. In other cases, such as when the transaction amount is above a threshold value, the processing network 950 may receive the authorization request message, determine the issuer associated with the user device 910, and forward the authorization request message for the transaction to the authorizing entity computer 960 for verification and authorization. Once the transaction is authorized, the authorizing entity computer 960 may generate an authorization response message (that may include an authorization code indicating the transaction is approved or declined) and transmit this electronic message via its external communication interface to processing network 950. The processing network 950 may then forward the authorization response message to the transport computer 940, which in turn may then transmit the electronic message to comprising the authorization indication to the resource provider computer 930, and then to the access device 920.

If the access data is in the form of a token, then the processing network 950 may exchange the token for a real credential (e.g., a PAN). Any authorization request message may then be modified to include the real credential and it may be forward to the authorizing entity computer 960 for verification. The authorizing entity computer 960 can generate an authorization response message with an approval or decline. The authorization response message can be transmitted to the processing network 950, and the processing network 950 may replace the credential with the token. The processing network 950 may then transmit the authorization response message back to the access device 920.

At the end of the day or at some other suitable time interval, a clearing and settlement process between the resource provider computer 930, the transport computer 940, the processing network 950, and the authorizing entity computer 960 may be performed on the transaction.

Embodiments of the invention provide a number of advantages. In particular, embodiments make use of multi-party computation (MPC) to secure user location data. MPC can protect user location data even if one of the entities are compromised or communications are intercepted. Location data sent by the mobile device is encrypted before being transmitted, and partially decrypted locations sent by the location server are still ciphertext and thus cannot be used by an malicious entity. Even if an attacker breaches the location server computer, the location data stored on the location server computer can all be encrypted, and key shares stored on the location server computer may not be used to decrypt the locations. If the interaction processing server is breached, only one decrypted location of the user may be available at a time, which can minimize the data leaked.

Embodiments allow MPC to be used when decrypting the location data, while using a small number of messages. Other MPC methods may involve techniques such as oblivious transfer, which takes several messages per bit of information transmitted. Such a technique may infeasible for a system that is decrypting millions of messages per day. Fewer messages in decryption can reduce the computational resources and bandwidth used, allowing more information to be decrypted efficiently.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive, or an optical medium such as a CD-ROM. Any such computer-readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a location server computer, encrypted location information from a mobile device, wherein the encrypted location information is associated with a location of the mobile device encrypted with a public key;
   receiving, by the location server computer, a location request message from an interaction processing server;
   partially decrypting, by the location server computer, the encrypted location information with a first private key share to form first partially decrypted location information; and
   transmitting, by the location server computer to the interaction processing server, a location response message with the encrypted location information and the first partially decrypted location information, wherein the interaction processing server uses a second private key share to partially decrypt the encrypted location information to form second partially decrypted location information, and then form decrypted location information from the first partially decrypted location information and the second partially decrypted location information.

2. The method of claim 1, further comprising, before receiving the encrypted location information:
   generating, by the location server computer, the public key and a private key, wherein the private key is split into the first private key share and the second private key share;
   storing, by the location server computer, the public key and the first private key share;
   transmitting, by the location server computer, the second private key share to the interaction processing server; and
   transmitting, by the location server computer, the public key to the mobile device.

3. The method of claim 2, wherein the private key is deleted after being split into the first private key share and the second private key share.

4. The method of claim 1, wherein the location information is encrypted according to an RSA cryptosystem.

5. The method of claim 1, wherein the encrypted location information is periodically received from the mobile device.

6. The method of claim 1, wherein the mobile device is a mobile phone.

7. The method of claim 1, wherein the location request message is part of an access interaction.

8. A location server computer comprising:
   a processor; and
   a non-transitory computer-readable medium comprising code executable by the processor to implement a method comprising:
   receiving encrypted location information from a mobile device, wherein the encrypted location information is associated with a location of the mobile device encrypted with a public key;
   receiving a location request message from an interaction processing server;
   partially decrypting the encrypted location information with a first private key share to form partially decrypted location information; and
   transmitting, to the interaction processing server, a location response message with the encrypted location information and the first partially decrypted location information, wherein the interaction processing server uses a second private key share to partially decrypt the encrypted location information to form second partially decrypted location information, and then form decrypted location information from the first partially decrypted location information and the second partially decrypted location information.

9. The location server computer of claim 8, the method further comprising, before receiving the encrypted location information:
   generating the public key and a private key, wherein the private key is split into the first private key share and the second private key share;
   storing the public key and the first private key share;
   transmitting the second private key share to the interaction processing server; and
   transmitting the public key to the mobile device.

10. The location server computer of claim 9, wherein the private key is deleted after being split into the first private key share and the second private key share.

11. The location server computer of claim 8, wherein the location is encrypted according to an RSA cryptosystem.

12. The location server computer of claim 8, wherein the encrypted location information is periodically received from the mobile device.

13. The location server computer of claim 8, wherein the mobile device is a mobile phone.

14. A method comprising:
- receiving, by an interaction processing server, an authorization request message from a resource provider computer for an interaction;
- sending, by the interaction processing server, to a location server computer, a location request message;
- receiving, by the interaction processing server from the location server computer, first partially decrypted location information and encrypted location information, wherein the first partially decrypted location information was decrypted using a first private key share;
- decrypting, by the interaction processing server, the encrypted location information using a second private key share to form second partially decrypted location information;
- determining, by the interaction processing server, decrypted location information using the first partially decrypted location information and the second partially decrypted location information; and
- initiating authorizing, by the interaction processing server, the interaction based on at least the decrypted location information.

15. The method of claim 14, further comprising, before receiving the authorization request message:
- sending, by the interaction processing server, to the location server computer, a key request message; and
- receiving, by the interaction processing server from the location server computer, the second private key share, wherein the second private key share and the first private key share were derived from a private key by the location server computer.

16. The method of claim 15, wherein the key request message is sent as part of a registration process.

17. The method of claim 14, wherein the method further comprises comparing location information of the resource provider computer to the decrypted location information and initiating authorizing the interaction if the location information of the resource provider computer matches the decrypted location information.

18. The method of claim 17, wherein an identifier of the resource provider computer is used to retrieve the location information of the resource provider computer.

19. The method of claim 14, wherein the interaction is a transaction.

20. The method of claim 14, wherein the interaction is an access interaction.

* * * * *